C. E. WRIGHT.
MECHANICAL MOVEMENT.
APPLICATION FILED DEC. 5, 1913.
1,194,689.
Patented Aug. 15, 1916.
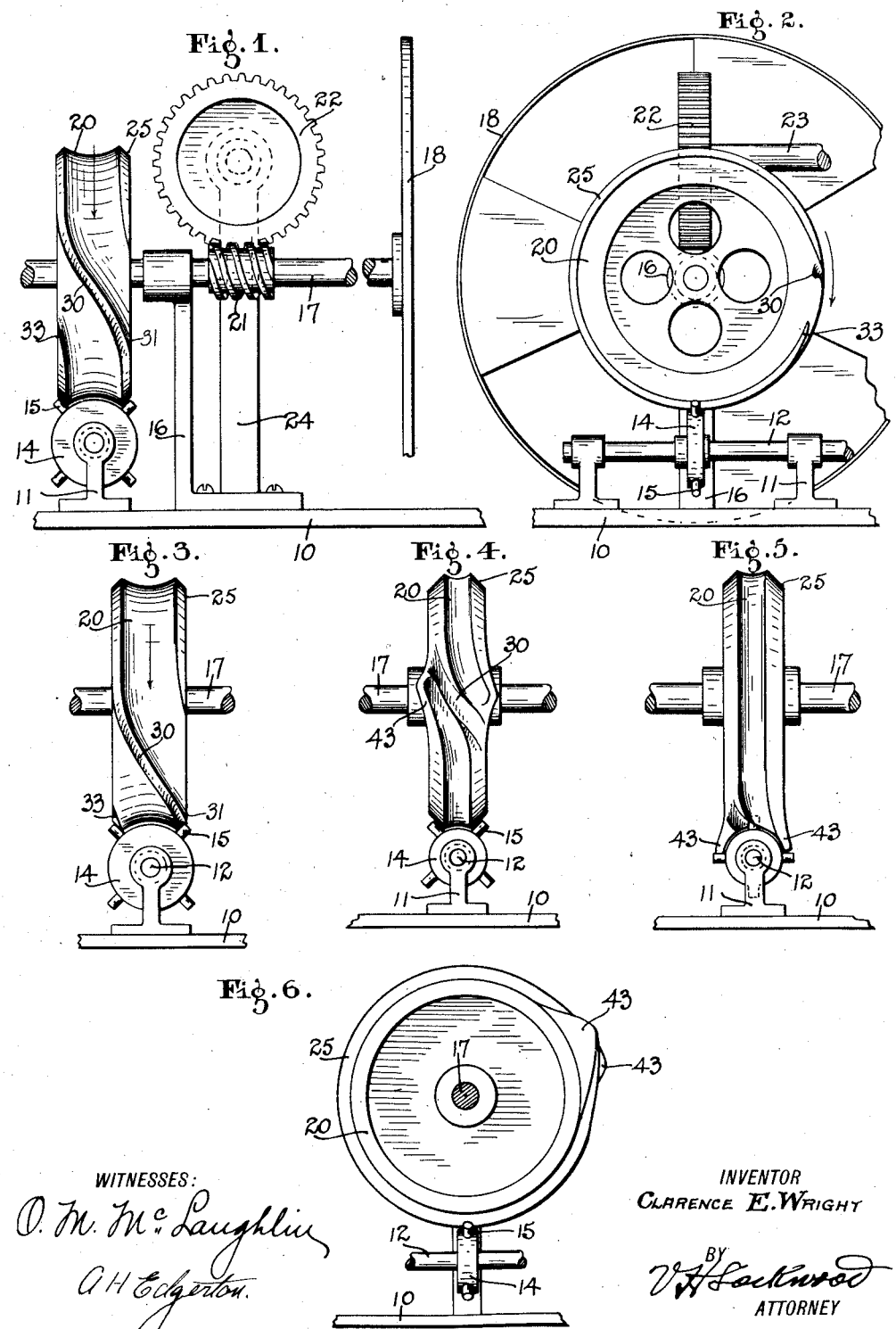
WITNESSES:
O. M. McLaughlin
A. H. Edgerton
INVENTOR
CLARENCE E. WRIGHT
BY
V. H. Lockwood
ATTORNEY

UNITED STATES PATENT OFFICE.

CLARENCE E. WRIGHT, OF LOUISVILLE, KENTUCKY, ASSIGNOR OF ONE-HALF TO ERNEST S. CARPENTER, OF LOUISVILLE, KENTUCKY.

MECHANICAL MOVEMENT.

1,194,689.   Specification of Letters Patent.   Patented Aug. 15, 1916.

Application filed December 5, 1913.  Serial No. 804,863.

*To all whom it may concern:*

Be it known that I, CLARENCE E. WRIGHT, a citizen of the United States, and a resident of Louisville, county of Jefferson, and State of Kentucky, have invented a certain new and useful Mechanical Movement; and I do hereby declare that the following is a full, clear, and exact description thereof, reference being had to the accompanying drawings, in which like letters refer to like parts.

The object of this invention is to provide an improved mechanical movement or means adapted particularly for use in moving picture machines for the purpose of simplifying the mechanism and rendering the action of a moving picture machine or the like positive and quick. All vibration and lost motion is avoided and little friction is present.

The chief feature of the invention consists in means for actuating a star wheel of the kind used for moving the film of a moving picture machine. For this purpose the star wheel is given successive quarter rotations and herein the star wheel is actuated by a cam wheel having an inclined groove across the periphery thereof for the passage of a pin on the star wheel. Four pins project from the star wheel shaft at equal distances apart and the periphery of the cam wheel is concave so as to fit close to said shaft and during the major portion of the revolution of the cam wheel two of the pins of the star wheel engage the two side edges of the cam wheel and before the groove across the cam wheel approaches one pin of the star wheel, a shoulder or elevation on the opposite edge of the cam wheel engages the opposite pin of the star wheel and turns the star wheel sufficiently to bring the opposite pin of the star wheel into the groove of the cam wheel. The shoulder is a radial extension and if desired may also extend laterally for the purpose of a more positive actuation of the star wheel.

The full nature of the invention will be understood from the accompanying drawings and the following description and claims.

In the drawings, Figure 1 is a side elevation of the portion of a moving picture machine which is used in operating the shutter and showing my invention. Fig. 2 is a front elevation thereof. Fig. 3 is an elevation of a part of what appears in Fig. 1 in altered position. Fig. 4 is an elevation of a modified form of the left-hand portion of what appears in Fig. 1. Fig. 5 is the same as Fig. 4 with the parts in changed position. Fig. 6 is a side elevation of Fig. 4.

In detail the mechanism, as shown in the drawings herein, includes a base plate 10 having bearings 11 thereon in which a shaft 12 is mounted which drives the sprocket wheels for a film in a moving picture machine or transmits power to any other mechanism. On said shaft there is a star wheel 14 secured consisting of a disk with four equidistant pins 15 projecting radially from the periphery thereof.

On the base plate 10 there is a bearing support 16 in which a shutter shaft 17 is mounted. The shutter 18 is secured on one end of said shaft and on said shaft there is secured a cam wheel 20. The shaft 17 is driven by a worm 21 secured thereon and a worm gear 22 on a shaft 23 mounted on a post 24 which is driven by any suitable means or power, not shown.

The invention is not limited to the details of the construction or mounting of the parts so far described excepting the star wheel and cam wheel and the shafts on which they are secured. The cam wheel 20 is mounted so as to lie in the same plane as the shaft 12 and immediately adjacent the star wheel 14 and its periphery is concave transversely so as to conform to and be parallel with the circumferential surface of the star wheel. The axes of the two wheels lie at right angles to each other. Each lateral edge of the cam wheel is beveled or chamfered at 25 for the major portion of the circumference of the wheel, the bevel or chamfer transversely of the cam wheel being substantially parallel with the pins 15 of the star wheel, and the width of the cam wheel being substantially equal to the distance between two pins on the star wheel, as shown in Fig. 1. The object of this feature of the construction is that the cam wheel will fit close to the star wheel, and, for most of the revolutions of the cam wheels, lie between a pair of pins thereon, so that the star wheel can have no rotary movement or play, excepting when actuated by the cam wheel.

The cam wheel has across its periphery at one or more points an inclined or sinuous groove 30, passing from one chamfered edge 25 to the other chamfered edge. On each side of the cam wheel there is a shoulder 33 located opposite the groove 30 and with the slot approaching the shoulder lying opposite the entrance to the groove and slightly in advance of such entrance, so that the shoulder will engage one of the pins 15, as the wheel 20 revolves, and thus positively force the opposite pin 15 into the entrance of the groove opposite such shoulder. Said shoulder 33 is rectangular in cross section, being not beveled or chamfered, and also being elevated somewhat above the main periphery of the wheel 20, that is, radially extending, as indicated in Fig. 2. Opposite each shoulder 33 there is a projection 31 at the entrance to the groove and that projection also coöperates with the shoulder in causing the pin 15 to enter the groove, by engaging the outer surface of the pin and crowding it into the groove, as the wheel revolves. Either or both of these means will suffice to cause the pin to enter the groove and thereby the cam wheel will give the star wheel a quarter revolution each time a pin passes through the groove 30. The shoulder 33 actuates one of the pins while the other pin is getting started and travels for some distance in the groove 30 so that there is no chance for its escape from the groove. No more than a quarter rotation of the star wheel will result, because it will be stopped by the next succeeding pin 15 coming in contact with the lateral beveled edge of the cam wheel. Each side of the cam wheel is similarly formed so that it will operate the star wheel in either direction and the number of grooves 30 can be such as is desired.

The modified form shown in Figs. 4, 5 and 6, differs from that shown in Figs. 1, 2 and 3 in having the shoulders 43 extend radially farther than the shoulders 33 and also extend laterally farther than the shoulders 33 so that the cam wheel at that point is wider than elsewhere, as appears in Figs. 4 and 5. The beginning of each shoulder 43 is opposite and precedes the entrance to the groove 30, so that the shoulder engages a pin 15 on one side of the cam wheel and forces another pin 15 of the star wheel into the entrance to the groove on the opposite side of the cam wheel. But as compared with the preceding form, the shoulder is both a radial and a lateral extension and, therefore, much more rapidly and positively actuates the star wheel and continues to actuate the star wheel until the pin in the groove 30 gets almost through the groove. In the preceding form, after the pin enters the groove 30, one of the walls of the groove is the chief means for causing the further rotary movement of the star wheel. In the modified form the function of the groove is chiefly to permit the pin to pass across the base of the cam wheel, the rotary movement of the star wheel being caused almost entirely by the shoulder 43 and since said shoulder acts more directly and powerfully upon the pin because of the rotary movement of the star wheel, this modified form of the device is stronger than the preceding form and also there is in it less friction and at one point in the revolution of the cam wheel in the modified form, as shown in Fig. 5, the oppositely extending pins are both close to the shoulders 43, only one, however, being actuated and a third pin projecting into the groove 30 is about midway thereof.

The invention is:

1. In a mechanical movement, a star wheel with radially projecting pins, a rotatable cam disk mounted at a right angle to the star wheel and with its periphery lying between a pair of pins on the star wheel and having a sinuous groove across its periphery, a projection outside each entrance to said groove for engaging a pin on the star wheel and deflecting it into the groove, and a projection on the opposite edge of the cam wheel and substantially opposite the entrance to said groove in position to engage a pin on the star wheel, said projections and groove being arranged so that the pin on the star wheel will be caused to travel in said groove throughout the length thereof.

2. In a mechanical movement, a star wheel with radially projecting pins, a rotatable cam disk mounted at a right angle to the star wheel and with its periphery lying between a pair of pins on the star wheel and having a sinuous groove across its periphery, a projection outside each entrance to said groove for engaging a pin on the star wheel and deflecting it into the groove, and a projection on the opposite edge of the cam wheel and substantially opposite the entrance to said groove in position to engage a pin on the star wheel, said projections being both lateral and radial and said projections and groove arranged so that the pin on the star wheel will be caused to travel in said groove throughout the length thereof.

In witness whereof, I have hereunto affixed my signature in the presence of the witnesses herein named.

CLARENCE E. WRIGHT.

Witnesses:
A. S. HALL,
ERNEST CARPENTER.